… ...

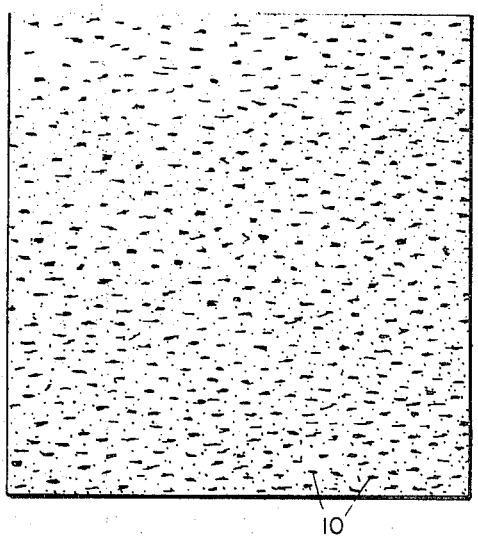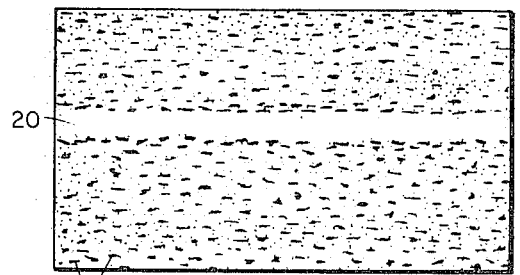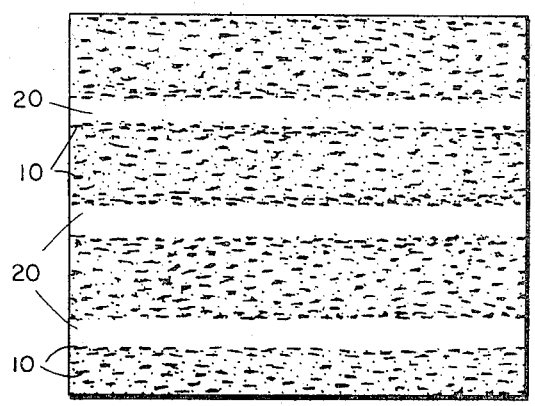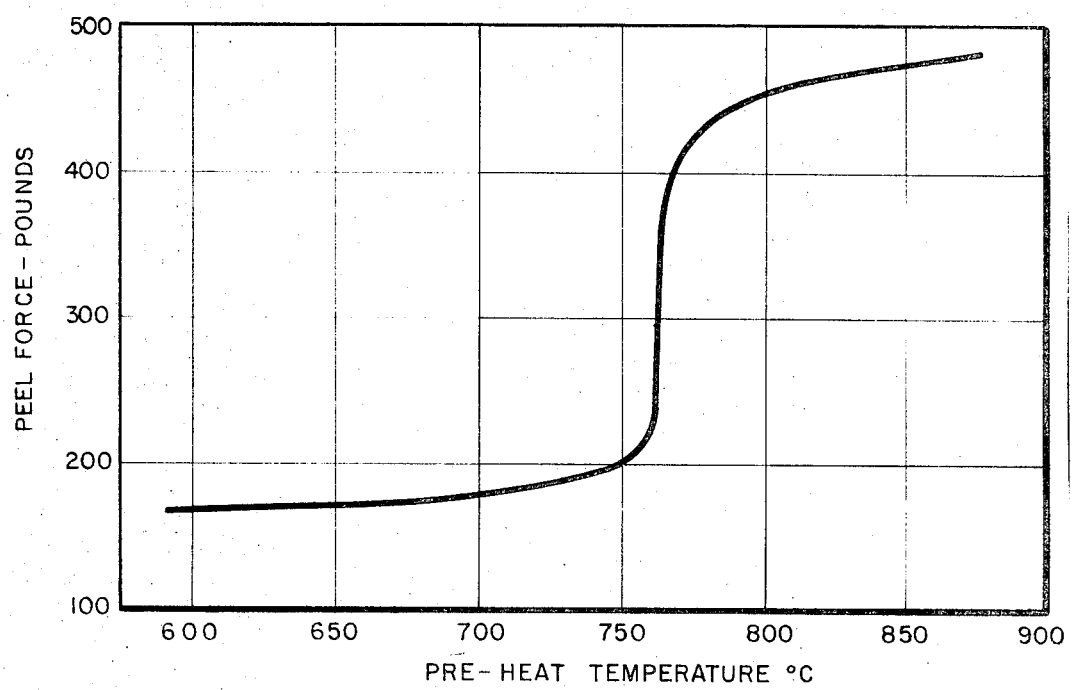
FIG. 1
FIG. 2
FIG. 2a
FIG. 3
INVENTORS,
FREDRIK O. HAARBYE,
PETER C. MURPHY
ATTORNEY

United States Patent Office 3,545,067
Patented Dec. 8, 1970

---

3,545,067
METHOD OF MAKING PREOXIDIZED SILVER-CADMIUM OXIDE MATERIAL HAVING A FINE SILVER BACKING
Fredrik O. Haarbye, and Peter C. Murphy, Indianapolis, Ind., assignors to P. R. Mallory & Co., Inc., Indianapolis, Ind., a corporation of Delaware
Continuation-in-part of application Ser. No. 445,038, Apr. 2, 1965. This application Dec. 9, 1966, Ser. No. 600,621
Int. Cl. B22f 3/24
U.S. Cl. 29—420.5                    7 Claims

ABSTRACT OF THE DISCLOSURE

A preoxidized silver-cadmium oxide material having a microstructure wherein there is a random distribution of particle sizes of the cadmium oxide throughout the material with no depleted cores. A backing for example of fine silver is connected to the contact material by a hot rolling method.

---

This application is a continuation-in-part of copending application S.N. 445,038, filed Apr. 2, 1965, now Pat. No. 3,317,991, in the name of Fredrik O. Haarbye which is incorporated into the present application by reference, and which is now U.S. Pat. 3,317,991.

Silver-cadmium-oxide strips for use as electrical contact materials are being increasingly used in many electrical applications. For the most part this electrical contact material is manufactured by two basic processes: (1) strip manufactured by casting bars of silver-cadmium alloy, rolling the bar to approximately the desired strip thickness, internally oxidizing the silver-cadmium strip, and where necessary, following with a rolling operation to size the strip, and (2) manufacture of preoxidized strip consisting essentially of stratified layers of fine and coarse cadmium oxide and areas depleted in CdO. These processes have inherent disadvantages. For the most part there will be a non-uniform distribution of cadmium oxide; there will be a depleted cented core; there is a thickness limitation of the strip; and control of the particle size is difficult.

In copending application S.N. 445,038 filed Apr. 2, 1965, in the name of Fredrik O. Haarbye, there is described a process for manufacturing preoxidized silver-cadmium oxide material from shot grain or pellets. As is more completely described in that application, this process in general comprises the steps of forming a silver-cadmium shot, internally oxidizing the shot, compacting the oxidized shot, extruding the shot, and cold working the extruded shape to final size. This process has succeeded in overcoming to a great extent, the disadvantages of the previously noted processes.

Having once made the silver-cadmium oxide strip, there then arises the problem of attaching the strip to a suitable backing material such as stainless steel, for example, to form the electrical contact. Normally this is done by welding or brazing. However, it has been found that silver-cadmium oxide contact materials are extremely difficult to attach directly to the stainless steel backing material. Silver-cadmium oxide strips are, therefore, first backed with a layer of fine silver. In the case of wrought silver-cadmium oxide materials (post oxidized), this fine silver layer is applied to the contact material, the contact material being in ingot or bar form. It has been found, however, that this process cannot be employed in the case of preoxidized silver-cadmium oxide materials made from the process of the above-noted copending application.

The present invention is concerned with the provision of a novel electrical contact material consisting of a silver-cadmium oxide strip and has as one of its objects the provision of such a material that has a more uniform distribution of cadmium oxide.

Another object of the invention is the provision of such a material that has no depletion center core.

Another object of the invention is the provision of such a material wherein there are no stratified layers of fine, coarse, and depleted cadmium oxide particles.

Still another object of the invention is the provision of such a material that has a random distribution of cadmium oxide particle sizes throughout the contact material.

Yet another object of the invention is the provision of such a strip material having a backing layer such as fine silver to form a bi-metal electrical contact material.

Still another object of the invention is to provide a method of applying such layers of fine silver to the silver-cadmium strip material.

Another object of the invention is to provide a hot roll-bonding method of applying a fine silver layer to the silver-cadmium oxide strip.

With the above and other objects in view, which will appear as the description proceeds, this invention resides in a novel electrical contact material and a process for making the same substantially as described herein and more particularly defined by the appended claims, it being understood that such changes in the precise embodiments here disclosed may be made as come within the scope of the claims.

In the drawings:

FIG. 1 is a cross-section of the silver-cadmium oxide strip at 300 magnifications made in accordance with the present invention.

FIG. 2 and 2a are cross sections of silver-cadmium oxide strips at 300 magnifications made by prior art methods, and FIGS. 3 through 5 are curves showing the effects of varying certain process variables in fabricating the strip in accordance with the invention.

Figure 4:
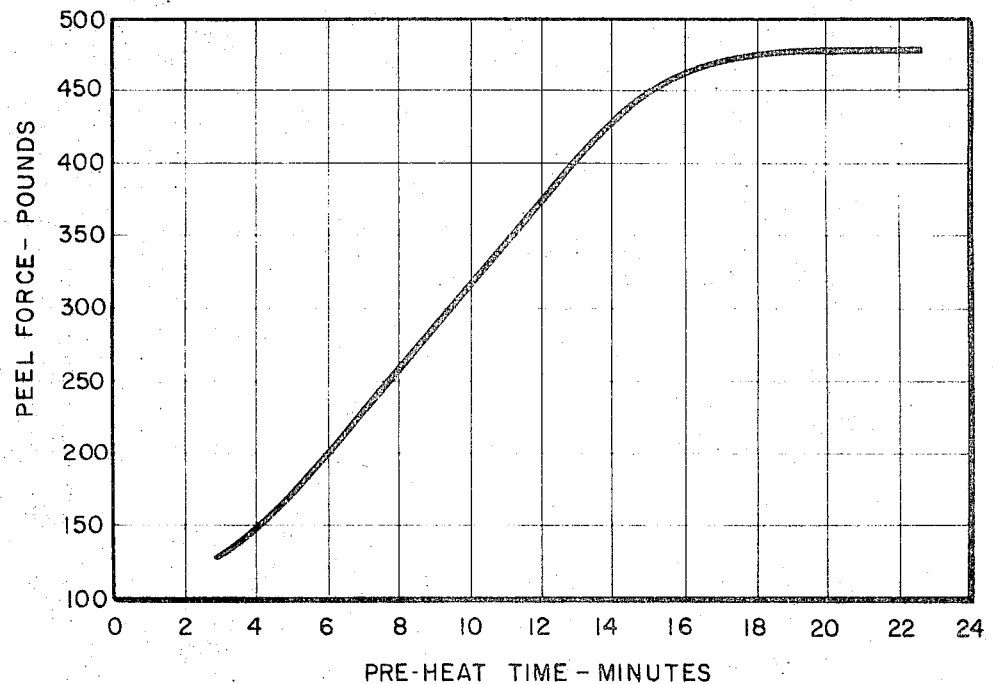

Generally speaking, the objects of the invention are accomplished by providing an electrical contact material consisting essentially of silver-cadmium oxide, the cadmium oxide being in an amount up to 30% by weight, having a microstructure wherein there is a random distribution of particle sizes of the cadmium oxide throughout the strip with no depleted cores. In its preferred embodiment, the material strip has a backing for example of fine silver integrally connected thereto.

The cadmium oxide content is limited to a maximum of 30% by weight because of poor contact characteristics and the inability to process the material by wrought metal processing techniques.

The method of manufacturing the silver-cadmium oxide material with the integrally connected silver backing in its broadest aspect comprises forming a silver-cadmium shot, internally oxidizing the shot, compacting the oxidized shot, extruding the shot, hot-roll bonding the backing to the extruded shape, and then rolling the resulting composite to the desired final thickness.

The microstructure of the electrical contact material of the present invention is more clearly shown with reference to FIG. 1. As shown there is a random distribution of particle sizes of the cadmium oxide 10 throughout the contact material. This is in contrast to other silver-cadmium oxide electrical contact materials wherein, for example, as shown in FIGS. 2 and 2a, there are depleted zones or cores 20 of cadmium oxide. In FIG. 2, the material has been post-oxidized while in FIG. 2a, the material has been preoxidized in stratified layers. Such depletion zones causes the electrical contact material to have a strong tendency to weld or stick together. In addition to the advantage derived from there being no depletion cores, the random particle size distribution throughout the material makes for a more uniform predictable material.

Preoxidized silver cadmium oxide strip made in accordance with this invention has been evaluated as an electrical contact material using a general purpose clapper type high current contactor. Post oxidized material was tested in the same program in order to obtain comparative results.

Contacts ⅜" in diameter were brazed to studs and assembled in the contractor. They were weighed at the start and finish of the test to obtain weight loss measurements. The voltage drop was measured at the start and end of the test with rated current through the contacts, and the temperature of the stationary contact support was monitored during the test. The contacts were tested for 20,000 operations making and breaking 150 amperes at 240 volts AC, and 45%–50% power factor.

The materials tested were:

Ag+10% CdO—preoxidized
Ag+15% CdO—preoxidized
Ag+10% CdO—post oxidized
Ag+15% CdO—post oxidized As indicated in the following table the electrical erosion (weightloss), voltage drop, and temperature rise all were lower on the preoxidized materials than on the post oxidized materials of a comparable composition. The lower values signify superior contact performance.

| Test number | Material | Wt. loss per contact pair in grams | Maximum temperature rise, °C. | Average millivolt start | Drop end |
|---|---|---|---|---|---|
| 3,610 | Ag–10% CdO preoxidized | .0275 | 43 | 28 | 13 |
| 3,611 | do | .0161 | 44 | 21 | 16 |
| 3,612 | do | .0267 | 40 | 30 | 17 |
| Average | do | .0234 | 42.3 | 26 | 13.8 |
| 3,670 | Ag–10% CdO postoxidized | .0436 | 43 | 23 | 15.6 |
| 3,671 | do | .0302 | 48 | 27.6 | 14 |
| 3,672 | do | .0346 | 49 | 32.4 | 24.3 |
| Average | do | .0361 | 46.7 | 27.7 | 19.7 |
| 3,619 | Ag–15% CdO preoxidized | .0375 | 45 | 31 | 16 |
| 3,620 | do | .0367 | 45 | 30 | 20.6 |
| 3,621 | do | .0354 | 44 | 32 | 18.2 |
| Average | do | .0365 | 44.7 | 31 | 18.7 |
| 3,637 | Ag–15% CdO postoxidized | .0460 | 44 | | |
| 3,638 | do | .0487 | 47 | | |
| 3,639 | do | .0475 | 46 | | |
| Average | do | .0473 | 45.3 | | |

While not desiring to be so limited, it is felt that the novel grain structure of the silver-cadmium oxide electrical contact material is achieved through the preoxidizing shot extrusion process of the above-noted application S.N. 445,038, due to oxidation of metal particles of small volumes. Since the cadmium oxide particle size is proportional to the total distance of oxygen travel during oxidation, a control of the cadmium oxide particle size is provided through control of the metal shot size for example as described in Ser. No. 445,038 for strip the maximum shot size should be about ¼" and for wire about 0.13 inch or for example, shot which will pass through a number 6 mesh screen. By reducing the cadmium oxide particle size, the surface area of the oxide is greatly increased without adversely affecting the electrical conductivity of the contact material. This increased surface area of cadmium oxide is believed beneficial in reducing the welding or sticking tendency of the contact during service. Also, the small size of the cadmium oxide particles has a hardening effect on the contact material, making this contact material less susceptible to wear. A practical method of control of cadmium oxide particle size has not existed prior to the method described in this invention. Also, because the oxygen path during oxidation is relatively short, oxidation is completed before any depletion of cadmium has occurred in the central portion of the metal shot or pellet, and size limitations of this type contact material in strip form are only governed by the mechanical limitations of the processing equipment, and not by metallurgical factors as in the case with post oxidized material.

The present invention also contemplates providing the silver-cadmium strip with a backing material, such as fine silver, integrally connected thereto to form a bi-metal strip. Such backing strip is necessary in order to bond the silver-cadmium strip to a material such as stainless steel so as to form an electrical contact.

Figure 5:
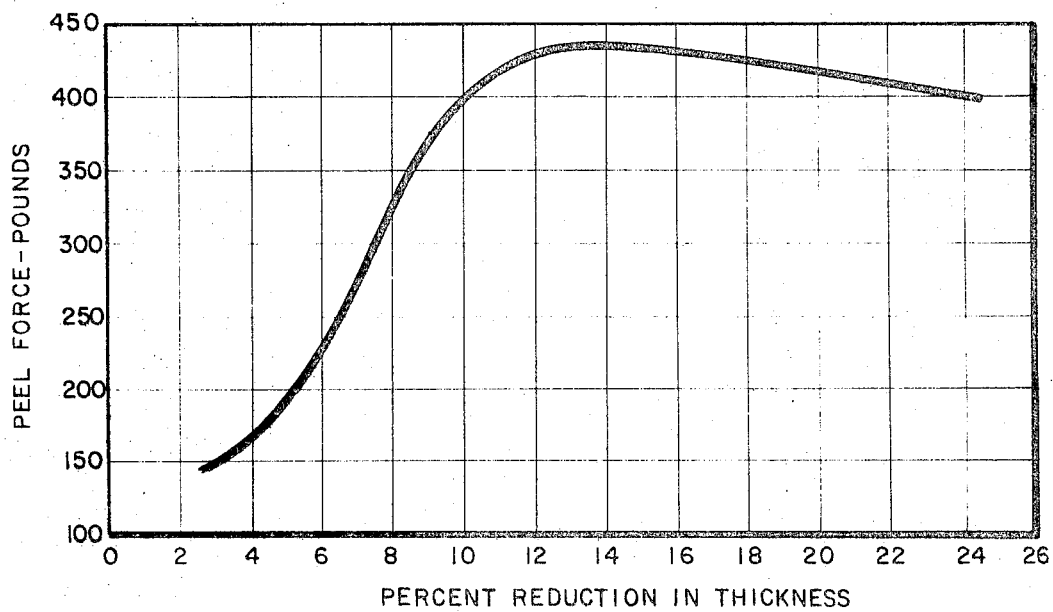

The preferred specific steps for forming the bi-metal strip after the shot has been extruded, in accordance with the process of the aforementioned copending application S.N. 445,038 are:

(1) Cut material for strip sandwich
(2) Tack weld one end of strip sandwich
(3) Preheat strip sandwich
(4) Roll-bond strip sandwich
(5) Roll-clad strip sandwich
(6) Roller-level clad strip and knurl silver side
(7) Trim back end of clad sandwich
(8) Slit clad sandwich to finish width As shown in FIGS. 3 through 5, there are three process variables which have a marked effect on bonding quality between the fine silver backing and the silver-cadmium strip. In the curves shown in the figures the peel strength, or the force necessary to separate the backing from the strip, is used as a parameter of the bond quality. As indicated in FIG. 3, optimum bond quality is obtained by utilizing a preheat temperature of from about 775° C. to 825° C. Such preheating is preferably done in a pull-through furnace. At higher temperatures there is danger of melting during preheat as well as danger of sticking of the metal sandwich to the rolls during rolling. At lower temperatures, insufficient diffusion takes place to give a complete bond over the entire interface. As indicated in FIG. 4, the length of time the metal sandwich is subjected to the preheat is of importance where long lengths are being fabricated. In general, a preheat time of from about 10 to 20 minutes is preferable for the noted preheat temperature.

The amount of reduction required for good bond strength is important for two reasons: it establishes intimate contact between the mating surfaces and creates additional fresh surface area free of metal axide or impurities. However, if the reduction is too great, surface cracking and other defects appear. In general, as indicated by the curve of FIG. 5, a minimum reduction of about 10% is needed to achieve a minimum backing strength, with an optimum being from about 10 to 25%.

The following illustrates the method for fabricating the novel electrical contact strip of silver-cadmium oxide with a fine silver metal backing.

A molten bath consisting of 70 pounds of silver–10% cadmium oxide by weight was superheated to about 1260° C. This molten bath was poured into a cast iron funnel having a plurality of apertures in a graphite insert. As the molten metal passed through the apertures it was subjected to an air 50% water stream flowing about normal to the molten metal such that the molten metal stream was broken into small fragments. The metal was then collected and cooled to a temperature of about 70° C. to form a silver-cadmium shot having a shot size of about—¼″ mesh. The shot was then air dryed at room temperature and then screened to a size of about—¼″ mesh. The shot was then oxidized by heating in an air atmosphere at 775–815° C. for 24 hours. The oxidized shot was then compacted under a pressure of about 85/90 t.s.i. and then extruded to form a strip .500″ x .125″ x 50′.

The extruded strip was then cut to a length of about 3′ and a fine silver strip of about .015″ thickness was tack welded to it. The resulting sandwich was then preheated in a batch furnace at a temperature of about 800° C. for 15 minutes. The fine silver backing was then roll-bonded to the silver-cadmium strip to form an integral part by passing the sandwich through a pair of rolls spaced .125″ apart. The resulting bi-metal strip was then reduced to a thickness of about .100″, a reduction of about 23% and roller leveled, the reduction being made in a single pass.

From the foregoing description taken in conjunction with the drawings it will be apparent to those skilled in the art that this invention provides a new and improved electrical contact material and a method of making the same. Accordingly, it is contemplated that the scope of the invention is to be determined from the claims appended hereto.

What is claimed is:

1. A method of forming a bi-metal electrical contact material comprising forming a silver-cadmium shot, internally oxidizing the shot, compacting the oxidized shot, extruding the shot, hot-roll bonding a fine silver backing to the extruded shot.

2. A method of forming a bi-metal electrical contact material comprising casting a silver-carmium shot, internally oxidizing the shot, compacting the oxidized shot, extruding the shot, connecting a fine silver backing material to said extruded shot so as to form a sandwich, preheating said sandwich at a temperature and for a length of time to achieve maximum peel force resistance to said backing material, roll-bonding said sandwich so as to integrally connect said silver backing to said strip to form the bi-metal electrical contact material, and thereafter rolling said bi-metal at a percentage reduction sufficient to yield a maximum peel force resistance to said material to reduce said material to a desired thickness.

3. A method for forming a bi-metal electrical contact material according to claim 2 wherein said sandwich is preheated at a temperature of from about 775° C. to 825° C. for from 10 to 20 minutes.

4. A method of forming a bimetal electrical contact material comprising: forming silver-cadmium particles; internally oxidizing said particles; consolidating the oxidized particles into a desired shape and; hot roll bonding a backing to the shape.

5. A method according to claim 4 in which after the backing is bonded to the shape, the composite is further rolled to final thickness.

6. A method according to claim 5 in which the backing material is fine silver.

7. A method according to claim 5 in which the resulting composite is then roll bonded to a different material.

References Cited
UNITED STATES PATENTS

| | | | |
|---|---|---|---|
| 3,199,176 | 8/1965 | Freudiger et al. | 29—420.5X |
| 3,221,392 | 12/1965 | Gould et al. | 29—420.5X |
| 3,258,829 | 7/1966 | Gwyn | 29—528X |
| 3,315,342 | 4/1967 | Roberts | 29—420.5 |
| 3,317,991 | 5/1967 | Haarbye | 29—420.5 |
| 3,320,664 | 5/1967 | Krantz | 29—420.5 |
| 2,148,040 | 2/1939 | Schwarzkopf | 29—420.5 |
| 2,222,251 | 11/1940 | Calkins et al. | 29—420.5UX |

JOHN F. CAMPBELL, Primary Examiner

D. C. REILEY, Assistant Examiner

U.S. Cl. X.R.

29—182.2, 182.5, 497.5, 504, 527.7, 630; 75—208